(12) United States Patent
Boyer

(10) Patent No.: US 7,302,912 B2
(45) Date of Patent: Dec. 4, 2007

(54) DISCHARGE UNIT FOR A GAME FEEDER

(76) Inventor: Thomas M. Boyer, 210 S. Hwy. 175, Seagoville, TX (US) 75159

( * ) Notice: Subject to any disclaimer, the term of this patent is extended or adjusted under 35 U.S.C. 154(b) by 302 days.

(21) Appl. No.: 11/233,458

(22) Filed: Sep. 22, 2005

(65) Prior Publication Data

US 2006/0048712 A1    Mar. 9, 2006

Related U.S. Application Data

(63) Continuation-in-part of application No. 11/097,907, filed on May 9, 2005, now abandoned.

(60) Provisional application No. 60/607,426, filed on Sep. 7, 2004.

(51) Int. Cl.
    *A01K 5/00* (2006.01)
(52) U.S. Cl. .................. 119/57.91; 119/51.01
(58) Field of Classification Search ............. 119/57.91, 119/52.1, 51.01, 53, 53.5, 61.2
    See application file for complete search history.

(56) References Cited

U.S. PATENT DOCUMENTS

| | | | | |
|---|---|---|---|---|
| 1,355,399 | A * | 10/1920 | Kelley | 119/57.91 |
| 2,808,029 | A * | 10/1957 | Geerlings | 119/53.5 |
| 3,034,480 | A * | 5/1962 | French | 119/57.91 |
| 4,337,728 | A * | 7/1982 | Van Gilst et al. | 119/57.4 |
| 4,945,859 | A | 8/1990 | Churchwell | 119/57.91 |
| 5,097,797 | A * | 3/1992 | Van Zee et al. | 119/57.4 |
| 5,235,934 | A * | 8/1993 | Runion | 119/51.01 |
| 5,245,949 | A * | 9/1993 | Hively | 119/53 |
| 5,291,855 | A * | 3/1994 | Laverty | 119/52.3 |
| 5,333,572 | A * | 8/1994 | Nutt | 119/57.91 |
| 5,367,983 | A * | 11/1994 | Pound et al. | 119/53 |
| 5,596,946 | A * | 1/1997 | Bryant et al. | 119/52.1 |
| 5,775,257 | A * | 7/1998 | Park | 119/57.8 |
| 5,782,200 | A * | 7/1998 | Knowles et al. | 119/53 |
| 5,829,383 | A * | 11/1998 | Blanding | 119/52.3 |
| 5,829,384 | A * | 11/1998 | Landry | 119/52.3 |
| 5,839,389 | A * | 11/1998 | Fujii | 119/53 |
| 6,481,374 | B1 | 11/2002 | Lillig | 119/52.1 |
| 6,510,813 | B1* | 1/2003 | Boone, Jr. | 119/57.91 |
| 6,691,640 | B1 | 2/2004 | Huckabee | 119/51.01 |
| 6,758,165 | B2 | 7/2004 | Pappas et al. | 119/72.5 |
| 6,761,129 | B1 | 7/2004 | Smith | 119/52.1 |
| 6,763,781 | B1 | 7/2004 | Norrell | 119/57.91 |
| 6,866,004 | B1* | 3/2005 | Lush | 119/52.1 |
| 6,920,841 | B2* | 7/2005 | Meritt | 119/51.01 |
| 6,957,626 | B2* | 10/2005 | Ela et al. | 119/57.9 |
| 6,959,664 | B1* | 11/2005 | Keuter et al. | 119/54 |
| 7,021,240 | B1* | 4/2006 | Tippetts | 119/52.1 |

(Continued)

*Primary Examiner*—Yvonne R. Abbott
(74) *Attorney, Agent, or Firm*—Charles D. Gunter, Jr.

(57) ABSTRACT

A discharge unit for an animal feeder attaches to the feed outlet of the feeder. The discharge unit has an upwardly extending coupling tube which engages the feeder outlet. Several feeder tubes extend outwardly from the lower end of the coupling tube and together with the lower end of the coupling tube define a central chamber of the discharge unit. A spreader cone is located within a floor region of the central chamber. Feed passing from the feed outlet of the feeder passes through the internal diameter of the coupling tube of the discharge unit and over the spreader cone before passing through the central chamber and through the feeder tubes to be discharged from the feeder.

16 Claims, 3 Drawing Sheets

U.S. PATENT DOCUMENTS

2005/0229860 A1* 10/2005 Meritt .................... 119/53
2006/0283396 A1* 12/2006 Hernandez ............. 119/51.13
2007/0028844 A1* 2/2007 Bodenstab et al. ........ 119/52.1

* cited by examiner

DISCHARGE UNIT FOR A GAME FEEDER

CROSS REFERENCE TO RELATED APPLICATIONS

The present application is a continuation-in-part of earlier filed utility patent application Ser. No. 11/097,907, filed May 9, 2005 now abandoned, which, in turn, claimed priority from provisional application Ser. No. 60/607,426, filed Sep. 7, 2004.

BACKGROUND OF THE INVENTION

1. Field of the Invention

The present invention relates generally to game and animal feeders for wildlife and, more specifically, to the discharge component of a gravity fed deer feeder.

2. Description of the Prior Art

For a number of years, it has been popular in many parts of the country to set out animal feeders, and particularly deer feeders, both to attract deer and to provide feed to the deer during the winter or other times when the natural supply of food is restricted. Over the years, automated feeders have been developed which are intended to automatically feed a small quantity of feed to the ground over time. Such feeders are available which are both solar or wind powered or powered by small electric devices using a DC power source, such as DC batteries.

Manual or gravity fed game and animal feeders are also well known in the art. A large number of conventional animal feeders comprise a hopper in the form of a cylindrical drum or barrel suspended or supported on legs a distance above the ground. Some conventional game feeders have a flat bottom wall with a hole through the center, and others may have a tapered bottom wall or a conical spout located at the bottom of the barrel or drum. Some conventional game feeders may also have an internal or external dispensing mechanism at their lower end for more effectively dispensing the particulate or granular feed material from the feeder.

Both the automatic and gravity fed style feeders are well known as shown by a representative sampling of the existing patent art. For example, U.S. Pat. No. 4,841,912, to Oswald, discloses an animal feeder that includes a tank supported over a feed pan by a plurality of straps projecting radially inwardly from the sidewall of the feed pan. The tank has a funnel portion that directs the feed into a hollow tubular valve which is adjustable to regulate the feed flow to the pan. The tubular valve has cross beams mounted on a hub which is supported on a bearing to allow rotation and thereby agitation of the feed within the valve. An inverted funnel-shaped cone is supported on the cross beams and protects the bearing from feed flowing through the feeder.

U.S. Pat. No. 4,945,859, to Churchwell, discloses a feeder which includes a bucket with a conical section extending from the lower end of the bucket to a discharge opening. A distributing assembly in the interior of the conical section meters feed from the interior of the bucket and conical section either by the action of wind against a sphere or by an electrical feeding assembly.

U.S. Pat. No. 6,481,374, to Lillig, utilizes a feeder tube which incorporates drain holes in the lower extent of the tube.

U.S. Pat. No. 6,763,781, to Norrell, shows a spinner discharge unit for an animal feeder.

U.S. Pat. No. 6,758,165, to Pappas etl al, shows an animal feeder with a discharge opening which includes an axial passage and a ball located within the passage.

Despite the advances represented by references of the above type, various problems remain. Automatic feeders can be used effectively in many situations. However, while such feeders are somewhat effective, they do suffer from certain disadvantages. For example, they are often difficult and inconvenient to load. Also, many feeders can be operated in a position where the feed simply empties out of the feeder onto the ground all at one time, defeating the purpose of the feeder in providing a constant, uniform discharge. Sometimes, feed is left within the feeder or hangs up in the discharge area of the feeder.

Similar problems exist with respect to conventional manual or gravity fed feeders. For example, one frequent problem with conventional flat bottom manual feeders that contain particulate or granular feed is that a significant amount of the particulate or granular feed material will accumulate on the flat bottom surrounding the feed outlet opening and not be dispensed; and when the particulate or granular feed material on the flat bottom of the drum or hopper becomes wet, it may spoil or rot and can damage the feeder as well as the dispensing mechanism.

Therefore, a need exists for an improved feeder which will provide more convenience and better distribution of the feed to the animals being fed.

There exists a need for an improved distribution unit for a game or animal feeder which distribution unit is simple in design and economical to manufacture and which more effectively distributes the feed from the hopper of the unit without clogging or becoming blocked.

SUMMARY OF THE INVENTION

It is therefore an object of the present invention to provide an improved discharge unit for a game or animal feeder which will prevent accumulation of particulate or granular feed material being discharged from the hopper of the unit and which will improve the flow of feed material through the outlet of the feeder.

It is another object of this invention to provide an improved discharge unit for a feeder which will prevent feed material in the feeder from sticking, clumping and spoiling.

Another object of this invention is to provide such a discharge unit which can be easily and quickly adapted to fit the discharge openings of a wide range of models and sizes of commercially available animal feeders.

Another object of this invention is to provide an improved discharge unit of the above type that can be easily and quickly installed on a variety of commercially available feeders with only simple, commonly available tools.

Another object of this invention is to provide an improved discharge unit for a feeder which is formed of a sturdy synthetic material which will not rust or corrode and yet which is sufficiently strong to dispense a large quantity of particulate or granular feed material contained within the feeder.

A still further object of this invention is to provide an improved discharge unit which is simple in construction, inexpensive to manufacture, and reliable in operation and which is formed of a rugged water and weather resistant material.

The present invention overcomes the previously mentioned problems, and is distinguished over the prior art in general and these patents in particular by providing a discharge unit for removable installation at a lower extent of animal feeder having a hopper body and having sidewalls, a bottom wall region and a cover which together define an initially open interior adapted to contain particulate or granular animal feed. The bottom wall region of the feeder has a feed outlet opening through which the feed material passes. The improved discharge unit has an upwardly extending coupling tube having an upper end and having a lower end, generally cylindrical sidewalls, an internal diameter and an external diameter which is sized to matingly engage the feed outlet opening of the feeder for attaching the discharge unit to the feeder.

A plurality of generally cylindrical feeder tubes extend outwardly from the lower end of the coupling tube, each of the feeder tubes having an inner extent and an outer extent, and wherein the inner extents of the feeder tubes, together with the lower end of the coupling tube define a central chamber of the discharge unit. The central chamber of the discharge unit has a floor region with a spreader cone extending upwardly therefrom within the central chamber in the direction of the internal diameter of the coupling tube, whereby feed passing from the feed outlet of the feeder passes through the internal diameter of the coupling tube of the discharge unit and over the spreader cone before passing through the central chamber and through the feeder tubes to be discharged from the feeder.

Preferably, the feeder tubes each have a mouth opening and wherein a feed stop in the form or a dam or weir is located in the mouth opening of each of the feed tubes, the feed stops serving to partially obstruct the mouth opening of each feed tube to thereby control the flow of feed from the discharge unit. The preferred feeder tubes are also joined to the coupling tube at downwardly extending angles to improve the gravity flow of feed from the discharge unit. The mouth opening of each feeder tube has a top lip and a bottom lip and wherein the top lip forms an overhang with respect to the bottom lip to thereby prevent water from dripping from the top lip into the mouth opening of the feeder tube.

The coupling tube can also be fitted with an internal sleeve which is mounted within the coupling tube flush with the internal diameter thereof, the internal sleeve extending along the sidewalls of the coupling tube downwardly into the central chamber of the discharge unit to further control the travel of feed being dispensed from the unit. The coupling tube, spreader cone and feeder tubes are preferably integrally molded from a synthetic material.

Additional objects, features and advantages will be apparent in the written description which follows.

DETAILED DESCRIPTION OF THE INVENTION

Figure 1:
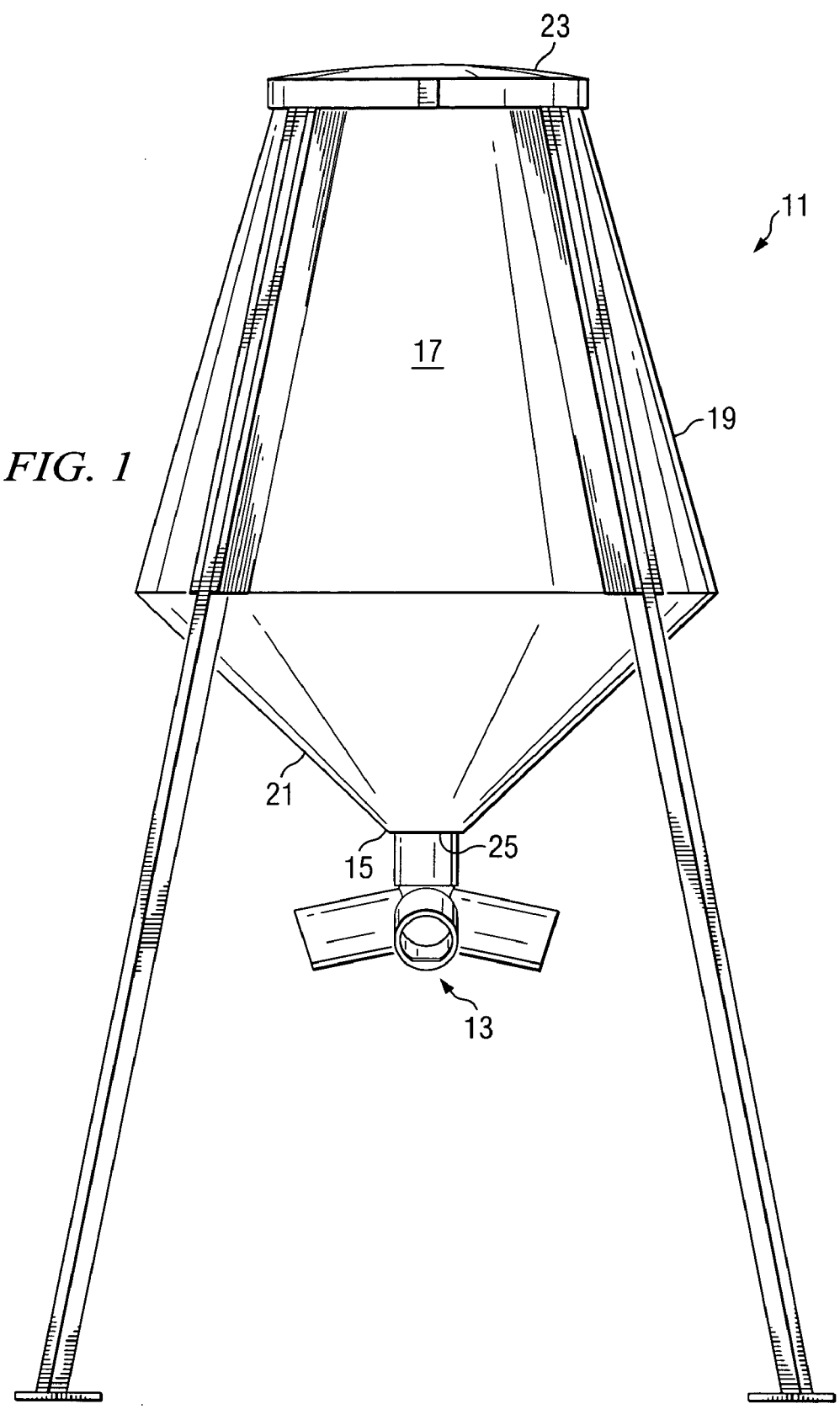
FIG. 1 is a perspective view of a commercially available game feeder having the improved discharge unit of the invention mounted thereon.
Figure 2:
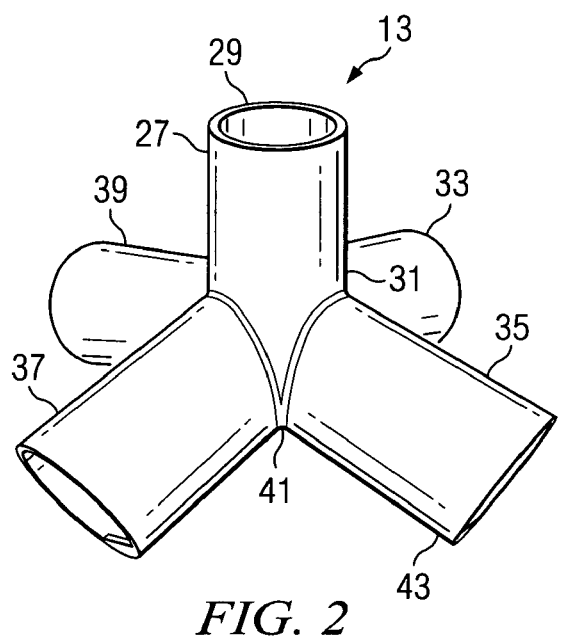
FIG. 2 is an isolated, perspective view of the discharge unit of the invention.

Turning now to FIG. 1, there is shown an animal feeder 11, which is equipped with the discharge unit 13 of the invention. As will be appreciated from FIG. 1, the discharge unit 13 is adapted for removable installation at a lower extent 15 of the animal feeder. The preferred feeder is a deer feeder having a conically shaped hopper body 17 with upper sidewalls 19 and oppositely tapered lower sidewalls 21, which terminate in a bottom wall region for the hopper. The hopper is also typically provided with a cover or lid 23. The sidewalls define and initially open interior for the hopper body 17, which is adapted to contain particulate or granular animal feed. The bottom wall region of the hopper body 17 terminates in a feed outlet opening 25, through which the feed material passes.

The particular deer feeder 11 illustrated in FIG. 1 is commercially available from Boss Buck, Inc., 210 South Highway 175, Seagoville, Tex. The feeder has a 1200 pound capacity hopper and is formed of 3/8" thick HDPE UV protected plastic material. While the unit has adjustable hardware components to allow adjustment for height to allow either automatic timed feeding or gravity feeding, the unit is illustrated assembled in the gravity feed mode. While a particular animal feeder 11 is illustrated for purposes of explaining the discharge unit of the invention, it will be appreciated by those skilled in the art that a large number of feeder designs could be utilized, as well. It is basically only necessary that the feeder be a gravity feed system which features a hopper with a feed outlet opening at the lower extent thereof.

FIGS. 2-5 illustrate the improved discharge unit 15 of the invention. The discharge unit 13 includes an upwardly extending coupling tube 27 having an upper end 29 and a lower end 31 (see FIG. 2). The coupling tube also has generally cylindrical sidewalls, and internal diameter and an external diameter which is sized to matingly engage the feed outlet opening 25 of the feeder 11 for attaching the discharge unit to the feeder. Preferably, the hopper body of the feeder has a downwardly extending cylindrical feed outlet opening. The coupling tube 27 is selectively sized to be closely received within the feed outlet opening whereby it can be held in position by two oppositely arranged bolts or other convenient securing means. By placing the coupling tube 27 within the mating feed outlet opening, the possibility of rain water being received within the discharge unit is reduced.

Returning to FIG. 2, a plurality of generally cylindrical feeder tubes 33, 35, 37, 39 extend outwardly from the lower end 31 of the coupling tube 27. Each of the feeder tubes 33, 35, 37, 39 has an inner extent (41 and FIG. 2) and an outer extent 43. The inner extents 41 of the feeder tubes, together with the lower end 31 of the coupling tube 27 define a central chamber (generally at 45 and FIG. 3) of the discharge unit.

The central chamber 45 of the discharge unit 13 has a floor region (illustrated by dotted lines as 47 and FIG. 3) with a spreader cone 49 extending upwardly therefrom within the central chamber 45 in the direction of the internal diameter (51 and FIG. 4) of the coupling tube 27. In this way, feed passing from the feed outlet 25 of the animal feeder passes through the internal diameter 51 of the coupling tube 27 of the discharge unit and over the spreader cone 49 before passing through the central chamber and through the feeder tubes to be discharged from the animal feeder. In the embodiment of the invention illustrated in FIG. 4, the spreader cone 49 has a tip 53 which extends slightly past the level of the lower end 31 of the coupling tube 27. The tip tapers conically downward in the direction of the floor region 47 of the chamber.

Figure 3:
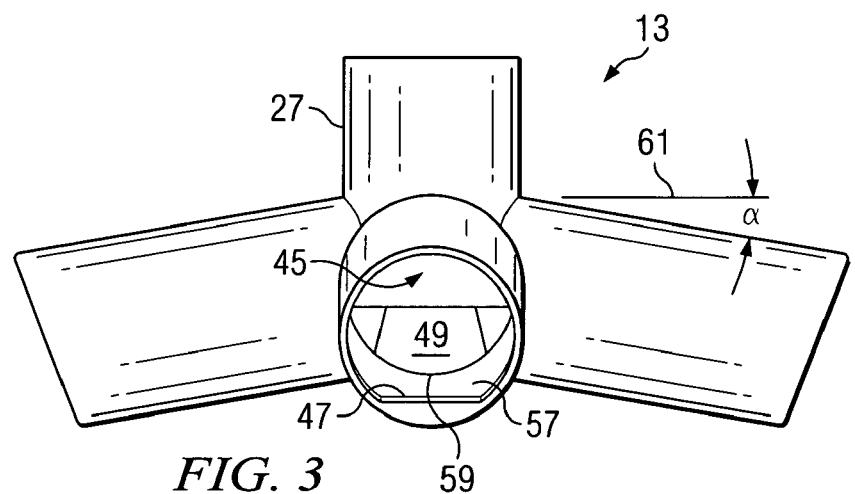
FIG. 3 is a close up, side view of the discharge unit of FIG. 2, showing the internal spreader cone and showing one of the feed stops which is located in the end of one of the feeder tubes of the unit.
Figure 4:
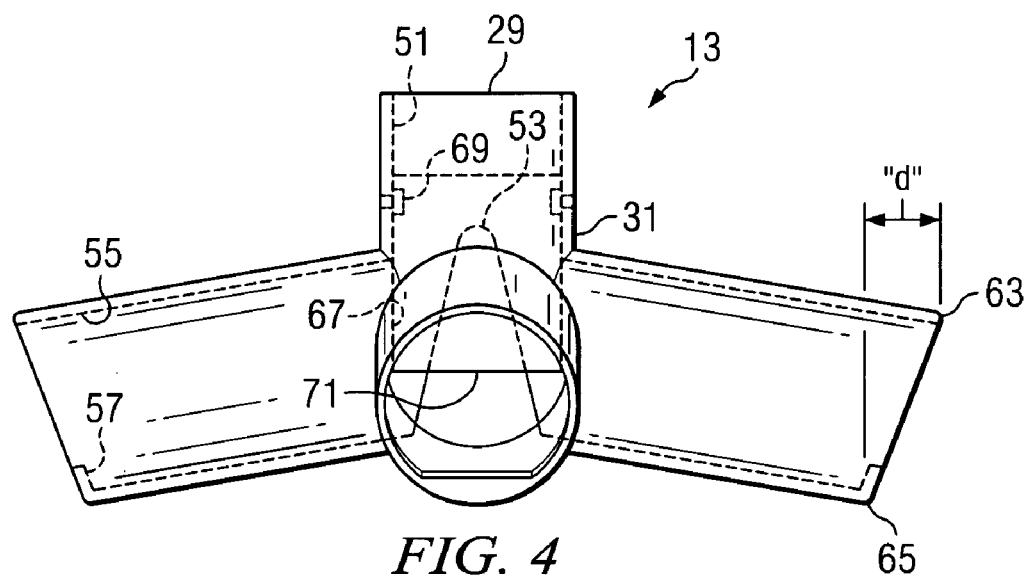
FIG. 4 is a side view, similar to FIG. 3, but showing certain of the internal components of the discharge unit in dotted lines.
Figure 5:
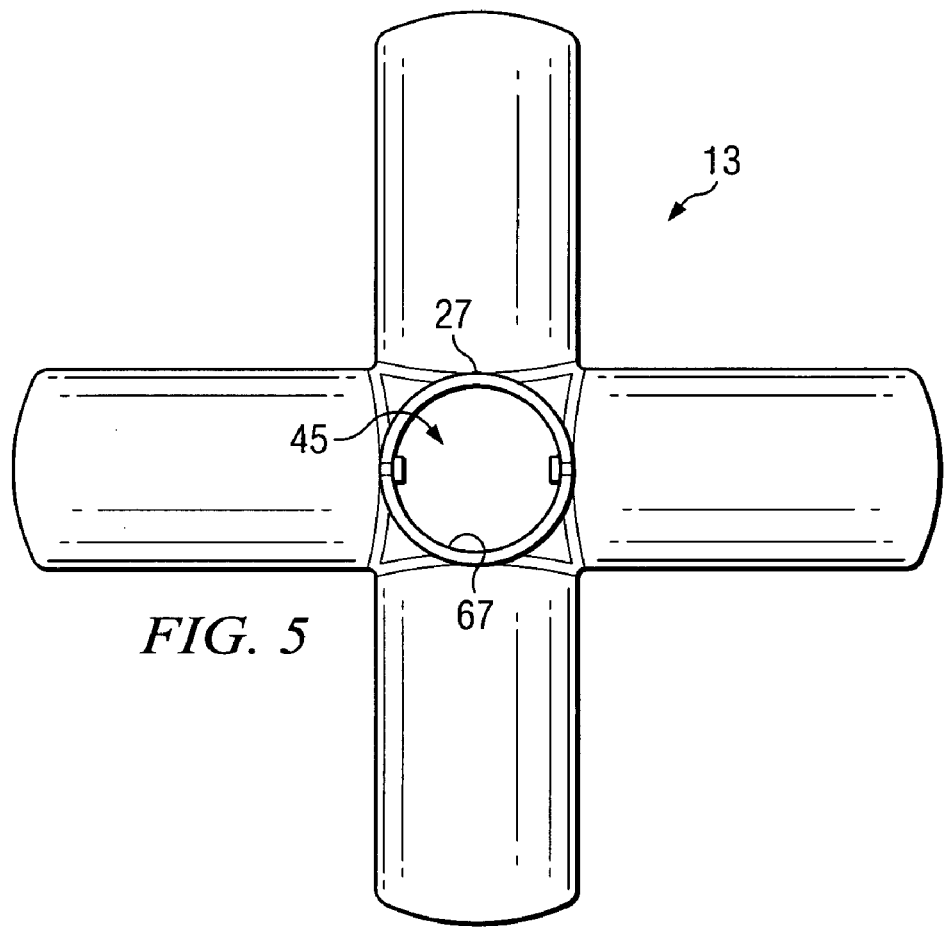
FIG. 5 is a top view of the discharge unit of FIG. 2.

Each of the feeder tubes 33, 35, 37, 39 has a mouth opening (55 in FIG. 4). A feed stop in the form of a dam or weir 57 is located in the mouth opening 55 of each of the feed tubes. The feed stops serve to partially obstruct the mouth openings 55 of each feed tube to provide additional control of the flow of the feed from the discharge unit. As shown in FIG. 3, the feed stops 57 form a semi-spherical obstruction which partially covers the mouth opening 55 of each of the feeder tubes. The mid point (59 in FIG. 3) of each semi-spherical opening represents an obstructing height which occupies between about ⅛ and ¼ of the area of the mouth opening in the particular embodiment illustrated.

As can be seen in FIG. 3, the feeder tubes 33, 35, 37, 39 are joined to the coupling tube 27 at downwardly extending angles to improve the gravity flow of feed from the discharge unit. Preferably, the feeder tubes are joined to the coupling tube 27 at an approximate 10% angle of pitch in the embodiment of FIG. 3 so that they extend downwardly at an angle "α" from a horizontal axis 61 drawn perpendicular to the cylindrical sidewalls of the coupling tube 27.

As best seen in FIG. 4, each feeder tube has a top lip 63 and a bottom lip 65. The top lip 63 forms an overhang with respect to the bottom lip 65 to thereby prevent water from dripping from the top lip into the mouth opening 55 of the feeder tube in use. As shown in FIG. 4, the top lip 63 is offset by a distance "d" to form the overhang.

Also with reference to FIG. 4, the coupling tube 27 is fitted with a closely mating internal cylindrical sleeve 67 held in place by internal screws 69. The cylindrical sleeve 67 is mounted within the coupling tube 27 flush with the internal diameter thereof. The internal sleeve extends along the sidewalls of the coupling tube 27 downwardly into the central chamber 45 of the discharge unit to further control the travel of feed being dispensed from the unit. The downward extent 71 of the internal sleeve 67 occupies approximately ⅕ of the internal diameter of the feeder tubes in the embodiment of the invention illustrated in FIG. 4.

Preferably, the coupling tube 27, spreader cone 49 and feeder tubes 33, 35, 37, 39 are integrally molded from a synthetic material. This can be conveniently accomplished by rotomolding these components of the device from a suitable synthetic such as a linear low density polyethylene. Rotomolding will be familiar to those skilled in the relevant arts. Basically, in rotational molding, the product is formed inside a closed mold or cavity where the mold is rotated by biaxially in a heating chamber. To obtain the mold rotation in two planes perpendicular to each other, a spindle is rotated on a primary axis, while the mold is rotated on a secondary axis. In the loading stage, either liquid or powdered plastic is charged into a hollow mold. The mold halves are then clamped shut and then moved into an oven where the loaded mold spins biaxially.

In the oven, heat penetrates the mold causing the plastic, if it is in the powder form, to become tacky and stick to the mold surface, or if it is in the liquid form, to start to gel. Usually, the heating is done by air or liquid or high specific heat, such as molting salt. Since the mold continues to rotate while the heating is going on, the plastic will gradually become distributed evenly on the mold cavity walls through gravitational force. As the cycle continues, the synthetic material melts completely and forms a homogeneous layer of molten plastic.

When the parts have been formed, the mold is moved to a cooling chamber where cooling is accomplished by either a cold spray of water and/or forced air or liquid circulation inside the mold. The mold continues to be rotated during the cooling cycle. Additional details on rotational molding can be found in the *Plastic Engineering Handbook of the Society of Plastics, Inc.*, 4th Ed. J. Frados, Nostrand-Reinhold Publishers, and similar references.

An invention has been provided with several advantages. The discharge unit of the invention is simple in design and economical to manufacture. Because the unit is rotomolded from a synthetic plastic, it will not rust or corrode. The plastic can be made UV resistant by incorporating appropriate additives. Since the discharge unit is molded from a synthetic material, rounded edges are present on the feeder tubes which prevent wild life from being injured when the muzzle or beak is inserted within the feeder tube. The interior spreader cone automatically distributes feed to the feeder tube outlet ports. The feeder tube outlet ports are formed at a 10% angle of pitch to make full use of gravity feeding. The inner sleeve within the coupling tube slows the progress of the feed preventing it from pouring through the lower unit. The feed dam which is present within each of the feeder tubes further prevents feed from pouring out of the unit in uncontrolled fashion. Each feed tube can also be provided with a drain hole on the bottom surface thereof to allow any moisture that enters the tube to escape. This prevents clogging of the tube which prevents even dispensing of feed as often happens with other gravity feeders on the market. The mouth openings of the feeder tubes present an approximate one inch overhang. The overhang design assures that water cannot drip from the top lip of the tube into the bottom area of the tube where feed is located. There are no "flat" or "dead" spots within the inner chamber of the unit. Feed is pulled by gravity to the mouth of the tube without ever stopping inside at a point where an animal cannot access the feed. The gravity fed nature of the system forces feed to the end of each feed port using natural forces. Animals that feed from the ports automatically keep the ports open and prevent clogging, which would otherwise prevent free choice feed systems from working properly. The discharge unit of the invention, unlike others typically sold in the market can be easily removed from the feeder unit. It is only necessary to unscrew two bolts on opposite sides of the coupling tube and to pull downwardly on the discharge unit. This allows the unit to be, for example, placed in a dishwasher to be sanitized or to free any obstruction that might come in bagged feed from a mill.

While the invention has been shown in only one of its forms, it is not thus limited but is susceptible to various changes and modifications without departing from the spirit thereof.

What is claimed is:

1. A discharge unit for removable installation at a lower extent of animal feeder having a hopper body and having sidewalls, a bottom wall region and a cover which together define an initially open interior adapted to contain particulate or granular animal feed, the bottom wall region of the feeder having a feed outlet opening through which the feed material passes, the discharge unit comprising:

an upwardly extending coupling tube having an upper end and having a lower end, generally cylindrical sidewalls, an internal diameter and an external diameter which is sized to matingly engage the feed outlet opening of the feeder for attaching the discharge unit to the feeder;

a plurality of generally cylindrical feeder tubes extending outwardly from the lower end of the coupling tube, each of the feeder tubes having an inner extent and an outer extent, and wherein the inner extents of the feeder tubes, together with the lower end of the coupling tube define a central chamber of the discharge unit;

wherein the central chamber of the discharge unit has a floor region with a spreader cone extending upwardly therefrom within the central chamber in the direction of the internal diameter of the coupling tube, whereby feed passing from the feed outlet of the feeder passes through the internal diameter of the coupling tube of the discharge unit and over the spreader cone before passing through the central chamber and through the feeder tubes to be discharged from the feeder.

2. The discharge unit of claim 1, wherein the feeder tubes each have a mouth opening and wherein a feed stop in the form or a dam or weir is located in the mouth opening of each of the feed tubes, the feed stops serving to partially obstruct the mouth opening of each feed tube to thereby control the flow of feed from the discharge unit.

3. The discharge unit of claim 2, wherein the mouth opening of each feeder tube has a top lip and a bottom lip and wherein the top lip forms an overhang with respect to the bottom lip to thereby prevent water from dripping from the top lip into the mouth opening of the feeder tube.

4. The discharge unit of claim 1, wherein the feeder tubes are joined to the coupling tube at downwardly extending angles to improve the gravity flow of feed from the discharge unit.

5. The discharge unit of claim 4, wherein the feeder tubes are joined to the coupling tube at an approximate 10° angle of pitch so that they extend downwardly at an angle from a horizontal axis drawn perpendicular to the cylindrical sidewalls of the coupling tube.

6. The discharge unit of claim 1, further comprising an internal sleeve which is mounted within the coupling tube flush with the internal diameter thereof, the internal sleeve extending along the sidewalls of the coupling tube downwardly into the central chamber of the discharge unit to further control the travel of feed being dispensed from the unit.

7. The discharge unit of claim 1, wherein the coupling tube, spreader cone and feeder tubes are integrally molded from a synthetic material.

8. The discharge unit of claim 7, wherein the coupling tube, spreader cone and feeder tubes are rotationally molded from linear low density polyethylene.

9. An animal feeder, comprising:
a hopper body and having sidewalls, a bottom wall region and a cover which together define an initially open interior adapted to contain particulate or granular animal feed, the bottom wall region of the feeder having a feed outlet opening through which the feed material passes;
an upwardly extending coupling tube mounted on the feed outlet opening of the feeder, the coupling tube having an upper end and having a lower end, generally cylindrical sidewalls, an internal diameter and an external diameter which is sized to matingly engage the feed outlet opening;
a plurality of generally cylindrical feeder tubes extending outwardly from the lower end of the coupling tube, each of the feeder tubes having an inner extent and an outer extent, and wherein the inner extents of the feeder tubes, together with the lower end of the coupling tube define a central chamber of the discharge unit;
wherein the central chamber of the discharge unit has a floor region with a spreader cone extending upwardly therefrom within the central chamber in the direction of the internal diameter of the coupling tube, whereby feed passing from the feed outlet of the feeder passes through the internal diameter of the coupling tube of the discharge unit and over the spreader cone before passing through the central chamber and through the feeder tubes to be discharged from the feeder.

10. The animal feeder of claim 9, wherein the feeder tubes each have a mouth opening and wherein a feed stop in the form or a dam or weir is located in the mouth opening of each of the feed tubes, the feed stops serving to partially obstruct the mouth opening of each feed tube to thereby control the flow of feed from the discharge unit.

11. The animal feeder claim 10, wherein the mouth opening of each feeder tube has a top lip and a bottom lip and wherein the top lip forms an overhang with respect to the bottom lip to thereby prevent water from dripping from the top lip into the mouth opening of the feeder tube.

12. The animal feeder of claim 9, wherein the feeder tubes are joined to the coupling tube at downwardly extending angles to improve the gravity flow of feed from the discharge unit.

13. The animal feeder of claim 12, wherein the feeder tubes are joined to the coupling tube at an approximate 10° angle of pitch so that they extend downwardly at an angle from a horizontal axis drawn perpendicular to the cylindrical sidewalls of the coupling tube.

14. The animal feeder of claim 9, further comprising an internal sleeve which is mounted within the coupling tube flush with the internal diameter thereof, the internal sleeve extending along the sidewalls of the coupling tube downwardly into the central chamber of the discharge unit to further control the travel of feed being dispensed from the unit.

15. The animal feeder of claim 9, wherein the coupling tube, spreader cone and feeder tubes are integrally molded from a synthetic material.

16. The animal feeder of claim 15, wherein the coupling tube, spreader cone and feeder tubes are rotationally molded from linear low density polyethylene.

* * * * *